United States Patent [19]

Corte et al.

[11] 4,077,918

[45] Mar. 7, 1978

[54] PROCESS FOR THE PREPARATION OF ANION EXCHANGERS BY AMINOALKYLATION OF CROSSLINKED AROMATIC POLYMER USING SULPHUR TRIOXIDE CATALYST

[75] Inventors: Herbert Corte, Leverkusen; Harold Heller, Cologne; Otto Netz, Leverkusen, all of Germany

[73] Assignee: Bayer Aktiengesellschaft, Leverkusen, Germany

[21] Appl. No.: 680,099

[22] Filed: Apr. 26, 1976

[30] Foreign Application Priority Data

Apr. 30, 1975 Germany .............................. 2519244

[51] Int. Cl.[2] .............................................. C08F 8/30
[52] U.S. Cl. .................................. 260/2.1 E; 526/41; 526/19; 526/49
[58] Field of Search ........... 526/41; 260/2.1 R, 2.2 R, 260/2.1 E

[56] References Cited

U.S. PATENT DOCUMENTS

| 3,791,996 | 2/1974 | Wuchter ............................... 526/41 |
| 3,882,053 | 5/1975 | Corte et al. ...................... 260/2.1 E |
| 3,989,650 | 11/1976 | Forge et al. ........................... 526/50 |

*Primary Examiner*—Joseph L. Schofer
*Assistant Examiner*—Peter F. Kulkosky
*Attorney, Agent, or Firm*—Connolly and Hutz

[57] ABSTRACT

Anion-exchange resins made by aminoalkylating an alkylatable resin in solvent-swollen condition with bis-carboxyimidomethyl ethers in a reaction mixture containing essentially unhydrated $SO_3$ that can be added in the form of a solution in $H_2SO_4$ or other solvent or as a complex with the alkylating ether, or in undissolved condition. The acylaminoalkylated product thus formed is deacylated as by hydrolysis and can have the resulting amino group alkylated and even quaternized.

8 Claims, No Drawings

PROCESS FOR THE PREPARATION OF ANION EXCHANGERS BY AMINOALKYLATION OF CROSSLINKED AROMATIC POLYMER USING SULPHUR TRIOXIDE CATALYST

The present invention relates to a new process for the preparation of crosslinked, water-insoluble synthetic resins with anion exchange properties by introducing aminoalkyl groups into crosslinked, insoluble, organic polymers containing aromatic nuclei.

It is known from U.S. Pat. No. 3,882,053 that synthetic resins with anion exchange properties can be obtained when crosslinked, insoluble organic polymers containing aromatic nuclei are reacted with bis-dicarboximidoalkyl ethers in the presence of swelling agents and Friedel-Crafts catalysts, and the resulting dicarboximidoalkylated reaction products are then saponified and further treated if desired.

However the alkylation of the polymers by this process still presents problems.

It has now been found that the foregoing polymer alkylation can be improved when sulphur trioxide is used as catalyst.

The present invention accordingly concerns an improved process for the preparation of synthetic resins having anion exchange properties by reaction of crosslinked, water-insoluble synthetic resins containing aromatic nuclei with bis-dicarboximidoalkyl ethers in the presence of swelling agents and sulphur trioxide.

Bis-dicarboximidoalkyl ethers which can be used according to the process of the present invention are, in general, the ethers of N-alkylolated cyclic imides of organic dicarboxylic acids. Examples of such dicarboxylic acids are: phthalic acid, diglycollic acid, succinic acid, maleic acid, glutaric acid and tetrahydrophthalic acid. Examples of preferred ethers are: bis-succinimidomethyl ether, bis-diglycolimidomethyl ether and bis-tetrahydrophthalimidomethyl ether, bis-phthalimidomethyl ether being particularly preferred.

The bis-dicarboximidoalkyl ethers and their preparation are known (compare Berichte der dt.chem. Gesellschaft 31 (1898) 1232), and others can be prepared in an analogous manner by the elimination of water from the corresponding N-methylol-dicarboxylic acid imides.

The crosslinked, water-insoluble organic polymers containing aromatic nuclei to be alkylated are also known and are described in U.S. Pat. No. 3,882,053 as well as in Belgian Pat. No. 828.034. They are preferably vinyl-aromatic compounds, which, for example, are obtained by copolymerization of monovinyl compounds and polyvinyl compounds. Copolymers of this type as well as their preparation are also known and described in the foregoing patents. The copolymers can be either microporous, that is to say have a gel structure, or macroporous.

Preferred copolymers are those which are synthesized from a major proportion of monovinyl-aromatic compounds and a small proportion of aromatic or aliphatic polyvinyl compounds. The proportion of polyvinyl compounds, which act as crosslinking agents, can vary within wide limits. In the case of copolymers with a gel structure, amounts of 0.5 to 20 percent by weight of polyvinyl compounds are generally employed and amounts of 0.5 to 10 percent by weight are preferably employed, whilst in the case of the macroporous copolymers, amounts of 2 to 50% of polyvinyl compounds, preferably 2 to 20%, are employed. Macroporous copolymers are particularly preferred for the process according to the present invention and such macroporous structure can be achieved according to known methods, for example by polymerization in the presence of high-molecular substances, swelling agents or precipitants, or by a combination of these methods (compare Adv. Polymer Sci. Volume 5 (1967), pages 113–213).

Examples of suitable monovinyl-aromatic compounds are: vinylnaphthalene, styrene, and substituted styrenes such as for examply vinyltoluene, vinylanisole and ethylstyrene. Styrene is preferred.

Examples of suitable polyvinyl compounds are: divinyl ether, divinylpyridine, divinyltoluenes, divinylnaphthalenes, ethylene glycol diacrylate, divinylxylene, divinylethylbenzene, divinylsulphone, polyvinyl ethers or polyallyl ethers of glycol, glycerol and pentaerythritol, divinyl ketone, divinyl sulphide, N,N'-methylene diacrylamide, N,N'-methylenedimethacrylamide, N,N'-ethylene diacrylamide, 1,2-di-($\alpha$-methylmethylenesulphonamido)- ethylene, trivinylbenzene, trivinylnaphthalene, polyvinylanthracenes, trivinylcyclohexane and, preferably, divinylbenzene and ethylene glycol dimethacrylate.

Up to about 10% by weight of the total weight of the monomers can be replaced by other vinyl compounds such as for example methacrylic and acrylic compounds, especially acrylonitrile, ethylene, propylene, isobutylene, vinyl chloride, vinyl acetate, vinylidene chloride, vinylpyridine and substituted vinylpyridines as well as vinyl quinolines and vinylpyrrolidone, as well as polyethyleneically unsaturated compounds such as isoprene, butadiene, chloroprene, piperylene, pentadiene, hexadiene, octadiene, decadiene, hexatriene and cyclopentadiene, their substitution products, for example chloroprene, 2,3-dimethyl-butadiene, 2,5-dimethyl-hexadiene and 2,5-dimethyl-octadiene, all of which generally react as though they possessed only one double bond.

Swelling agents which can be used in the process according to the present invention are, for example, halogenated hydrocarbons, such as methylene chloride, carbon tetrachloride, dichloroethane, trichloroethylene, symmetrical tetrachloroethane, 1,1,2-trichloroethane, tetrachloroethylene, dichloropropane, pentachloroethane, trichloropropanes and tetrachloropropanes, and also polar organic solvents such as dimethylformamide, dimethylsulphoxide and sulpholane, as well as aliphatic or aromatic hydrocarbons which are substituted by nitro groups, such as 1-nitropropane, 2-nitropropane, nitroethane or nitrobenzene, and any others suggested by the prior art including the foregoing patents. The swelling agents can be used individually or mixed with one another. Those swelling agents which dissolve the sulphur trioxide adduct of the bis-dicarboximidoalkyl ether which is formed during the reaction according to the process of the invention, are preferred and ethylene chloride is particularly preferred. In general the proportion of swelling agent to polymer is from about 100 to about 2000% by weight, although other proportions can be used.

The amino alkylation reaction of the present invention is generally carried out at temperatures of about 0° to 150° C, preferably at about 20° to 100° C. The bis-dicarboximidoalkyl ethers are generally employed in amounts of about 0.5 to 4 mols, preferably about 0.75 to 2.5 mols, per mol of aromatic nuclei present in the polymer.

Sulphur trioxide can be used dissolved in sulphuric acid, for example as an approximately 20 – 80% strength solution, but advantageously is used as liquid sulphur trioxide or as a solution of sulphur trioxide in the solvent which is used as the swelling agent. In general, about equimolar amounts of sulphur trioxide and bis-dicarboximidoalkyl ether are used but it is also possible to work with a less than equivalent amount or with an excess of sulphur trioxide, for example with about 0.1 to 1.5 mols, preferably about 0.5 to 1.1 mols, of sulphur trioxide per mol of bis-dicarboximidoalkyl ether, whereby the higher amounts of sulphur trioxide per mol ether are used if a higher substitution is desired and vice versa. The effectiveness of the $SO_3$ in improving the aminoalkylation appears to be related to the fact that it forms adducts with the alkylating ethers. In any event no significant amount of sulfonation takes place.

The procedure followed for carrying out the process of the present invention can be quite varied. Thus the polymer and swelling agent can first be combined and sulphur trioxide then introduced. However according to a preferred embodiment, the sulphur trioxide adduct of the bis-dicarboximidoalkyl ether is first prepared by bringing both components together in the presence of the swelling agent, and then the polymer is introduced into this mixture and allowed to swell, or the polymer is first swelled with the swelling agent and this mixture then combined with a solution of the sulphur trioxide adduct in the swelling agent, in which case it is advantageous to add the solution of the sulphur trioxide adduct to the suspension of the polymer in the swelling agent. If in the reaction there is formed more than one mol of water per mol of sulphur trioxide used it has proved advantageous to distill off aceotropically the water which is formed during the reaction.

The formation of the sulphur trioxide adducts in the reaction mixture or in a separate batch takes place spontaneously with liberation of substantial heat, so that cooling may be required. It has proved advantageous to effect such adduct formation in a temperature range of 0° to 80° C, preferably 20° to 60° C. When the adduct is prepared separately, the formation of the adduct can be followed very easily since a clear one-phase liquid generally forms from stoichiometric amounts of the reactants.

In order to split off the acyl radical the diacylimidoalkylated reaction products obtained according to the process of the present invention are saponified in a known manner (compare U.S. Pat. No. 3,882,053), for example by alkaline or acid hydrolysis of the acylimidoalkylation products or by reaction with hydrazine and subsequent acid hydrolysis, optionally in the presence of an organic solvent, which, for example, can be the swelling agent used for the diacylimidoalkylation. The acylimidoalkylation product is advantageously separated off from the reaction medium, for example by filtering. The isolated product can also be dried or washed with an organic solvent which is miscible with water, for example methanol, ethanol, dioxane or tetrahydrofurane. The dried or washed product can then be saponified, as for example in an autoclave at temperatures between 100° and 250° C with an excess of approximately 5 to 40% aqueous or alcoholic solution of an alkali metal hydroxide, such as sodium hydroxide or potassium hydroxide, or with an approximately 5 to 80% aqueous solution of a mineral acid, such as, for example, hydrochloric acid, hydrobromic acid or sulphuric acid.

On the other hand, the acylimidoalkylation product can be reacted with a 5 to 50% aqueous or alcoholic solution of hydrazine hydrate at temperatures of 50° to 100° C. In a preferred embodiment the last-mentioned solution can contain other alkalis, especially caustic alkalis, in amounts of 1 to 20%. The resulting reaction product can be isolated, washed with water and then treated with an aqueous solution of a mineral acid (5 to 20% strength) in order to complete the hydrolysis.

The aminoalkyl resins prepared according to the present invention can be modified in a known manner by simple alkylation. Known alkylating agents, such as alkyl halides, for example methyl chloride or bromide, ethyl chloride or bromide or propyl chloride or bromide, dialkyl sulphates, for example dimethyl sulphate, alkylene oxides, for example ethylene oxide or propylene oxide, halogenohydrins, polyhalogeno compounds, epihalohydrins, ethyleneimines or formaldehyde-formic acid mixtures, are used for this purpose.

An advantage of the process according to the present invention is that it is possible to prepare water-insoluble synthetic resins which contain aminoalkyl groups and have anion exchange properties, in a very gentle manner at temperatures below the boiling point of the solvent or swelling agent used, for example at 20° to 25° C and with virtually complete utilization of the amidoalkylating agent. This is extremely useful, industrially and economically.

Compared with the process known according to the state of the art for the preparation of water-insoluble synthetic resins which contain aminoalkyl groups and have anion exchange properties, the process according to the present invention makes possible a markedly higher substitution of the polymers and thus makes it possible to prepare anion exchangers, and especially macroporous anion exchangers, which have a high anion-exchange capacity with greater utilization of the amidoalkylating agent.

In view of the known reactivity of sulphur trioxide, fuming sulphuric acid and certain sulphur trioxide adducts as sulphonating agents (compare Houben-Weyl, Volume 9, page 503), it is to be regarded as extremely surprising that the diacylimidoalkylation of the present invention proceeds so smoothly and effectively without significant by-product formation. Fuming sulphuric acid is suggested in the foregoing Belgian patent for alkylating with diacylimidoalkyl esters, but for that purpose it is less effective than 98% sulphuric acid and produces a significant amount of sulphonation that detracts from the acid binding properties of the product.

EXAMPLE 1

600 g of phthalimide, 364 g of an aqueous formaldehyde solution (37%), 2,400 g of ethylene chloride and 50 ml of sodium carbonate solution (10%) were warmed slowly, whilst stirring. After about 2 hours, a clear mixture formed at about 73° C and this separated into 2 phases after the stirrer was switched off. The lower ethylene chloride phase was separated off.

2,500 g of the water containing N-methylolphthalimide solution thus obtained (content: 530 g of N-methylolphthalimide) were dehydrated in 2.5 hours by gentle boiling while separating water thus boiled off. In order to form bis-phthalimidomethyl ether, 5 g of sulphuric acid (98%) were added to the dehydrated product and the water of reaction formed by the etherification was removed from the system by additional gentle boiling for 12 hours. 200 ml of ethylene chloride were then distilled off leaving a solution that contained 480 g of bis-phthalimidomethyl ether, and traces of N-methylolphthalimide and phthalimide. The solution thus obtained was cooled to 20° to 25° C, whereupon some of the bis-phthalimidomethyl ether precipitated out. The suspension was then treated, whilst stirring and with external cooling, at 22° to 30° C with 120 g of liquid sulphur trioxide. The sulphur trioxide-ether adduct formed and a clear solution was obtained. After the heat of reaction had subsided, 150 g of a macroporous styrene bead polymer, which was crosslinked with 6% of divinylbenzene and had been obtained by polymerization in the presence of 70%, based on the weight of the monomers, of a mixture of $C_{12}$-hydrocarbons, were added to the batch. After the evolution of heat had subsided, the reaction was allowed to go to completion at 70° C in 23 hours.

The reaction mixture was then cooled, the reaction liquid filtered off and the ethylene chloride remaining in the filtered off resin was driven off with steam. The resulting product was heated with 25% strength sodium hydroxide solution to 180° to 185° C for 10 hours and then washed with water until neutral. There was obtained 1,090 ml of an anion exchanger with an acid-binding capacity of 2.21 equivalents/l for N/10 HCl and having an S content less than 0.1 percent by weight of the dry resin.

EXAMPLE 2

When 150 g of a styrene polymer which was crosslinked with 5% of divinylbenzene and had been rendered porous by adding 63%, based on the weight of the monomers, of a $C_{12}$-hydrocarbon mixture, were treated as described in Example 1, there has obtained 880 ml of an anion exchanger with an acid-binding capacity of 2.97 equivalents/l for N/10 HCl and an S content in the dry substance of less that 0.1 percent by weight.

EXAMPLE 3

120 g of liquid sulphur trioxide were introduced into a solution of 477 g of bis-phthalimidomethyl ether in ethylene chloride, prepared as indicated in Example 1, in the course of 5 minutes at 25° C, whilst stirring. The solution warmed to 45° C. After adding 318 g of the macroporous styrene bead polymer used in Example 1 and 1,400 g of ethylene chloride, the batch was stirred for 48 hours at 20° to 25° C and then worked up as described in Example 1. The anion exchange resin formed contained, in the dry substance, 81.35% of C, 9.25% of N and less than 0.1% of S.

Thus, the reaction with the bis-phthalimidomethyl ether proceeded virtually to completion (calculated from the elementary analysis).

EXAMPLE 4

10 g of liquid sulphur trioxide were added to 30 g of bis-succinimidomethyl ether in 250 ml of ethylene chloride at 20° C, whilst stirring. The suspension warmed spontaneously to 40° C and a clear solution formed. The solution of the sulphur trioxide-ether adduct prepared in this way was added to a suspension of 25 g of the macroporous styrene bead polymer used in Example 2 in 100 ml of ethylene chloride and the batch was warmed to 70° C for 19 hours. The reaction liquid was then filtered off, the residual ethylene chloride was driven off with steam and the reaction product was heated in 20% strength hydrochloric acid to 180° C for 10 hours. After cooling, the anion exchange resin formed was washed with water and 5% strength sodium hydroxide solution and finally rinsed with water until neutral.

Yield: 85 ml of anion exchanger.

Acid-binding capacity: 1.7 equivalents/l for N/10 HCl.

EXAMPLE 5

200 g of a macroporous styrene bead polymer, which was crosslinked with 8% of divinylbenzene and had been obtained by polymerization in the presence of 60%, based on the weight of the monomers, of a mixture of $C_{12}$-hydrocarbons, were added to a suspension of 486 g of bis-phthalimidomethyl ether in ethylene chloride, prepared as indicated in Example 1, and 130 g of fuming sulphuric acid (65% of $SO_3$ + 35% of $H_2SO_4$) were then added dropwise, whilst stirring. The suspension thus obtained was heated to 60° C for 15 hours and to 70° C for a further 8 hours and was further treated as indicated in Example 1. 860 ml of an anion exchanger with an acid-binding capacity of 2.7 equivalents/l for N/10 HCl were obtained. S content in the dry substance: less than 0.1 percent by weight.

EXAMPLE 6

A sulphur trioxide-ether adduct were prepared as described in Example 1, the only difference being that a solution of 120 g of sulphur trioxide in 65 g of pure sulphuric acid was used in place of 120 g of pure sulphur trioxide for the formation of the adduct from the ether and sulphur trioxide. The solution mixture, which was turbid at 20° to 30° C, gave a clear solution on warming to 50° C. 150 g of a macroporous styrene bead polymer, which was crosslinked with 5% of divinylbenzene and had been obtained by polymerization in the presence of 63%, based on the mixture of monomers, of a mixture of $C_{12}$-hydrocarbons, were swollen in this solution for 1 hour at room temperature and the mixture was then stirred at 60° C for 20 hours. After saponifying and working up the reaction product as described in Example 1, 950 ml of an anion exchanger with primary amino groups and an acid-binding capacity of 2.87 equivalents/l for N/10 hydrochloric acid were obtained. The dry substance contained 0.1% of sulphur.

EXAMPLE 7

250 g of a styrene bead polymer which was crosslinked with 4% of divinylbenzene and was in the form of a gel were reacted at 40° C, according to the instructions of Example 1. 850 ml of a weakly basic anion exchanger with an acid-binding capacity of 3.0 equivalents/l for N/10 hydrochloric acid were obtained.

EXAMPLE 8

40 g of liquid sulphur trioxide were added to 168 g of bis-phthalimidomethyl ether in 200 ml of 1,2-dichloropropane at 20° C, whilst stirring. The suspension warmed spontaneously to 46° C and the ether dissolved almost completely. The solution of the sulphur trioxide-ether adduct prepared in this way was treated, whilst stirring, with a suspension of 59.5 g of a macroporous vinyltoluene bead polymer, which was crosslinked with 10% of divinylbenzene and had been obtained by polymerization in the presence of 150%, based on the weight of the monomers, of a mixture of $C_{12}$-hydrocarbons, in 490 ml of 1,2-dichloropropane and the mixture was then warmed to 70° C for 18 hours. Working up was carried out as indicated in Example 1.

Yield: 435 ml of anion exchange resin.

Acid-binding capacity: 1.5 equivalents/l for N/10 HCl.

EXAMPLE 9

225 g of the macroporous styrene bead polymer used in Example 5 were added to 1,350 g of ethylene chloride. After 1 hour, 504 g of bis-phthalimidomethyl ether were added to the batch, whilst stirring, and 105 g of fuming sulphuric acid (65% of $SO_3$ + 35% of $H_2SO_4$) were then added at 40° in 20 minutes. The suspension warmed to 56° C and the bis-phthalimidomethyl ether went virtually completely into solution. The suspension was kept at 70° C for a further 18 hours and then worked up, as described in Example 1. 920 ml of an anion exchanger with an acid-binding capacity of 2.57 equivalents/l for N/10 HCl were obtained.

EXAMPLE 10

100 g of a macroporous styrene polymer, which was crosslinked with 6% of divinylbenzene and had been prepared by polymerization of a mixture of styrene and divinylbenzene, in which linear polystyrene with a molecular weight of 30,000 has been dissolved in an amount of 40% of the weight of the monomer and which, after polymerization, had been extracted with tetrahydrofurane, were swollen in a solution of the adduct of 170 g of bis-phthalimidomethyl ether and 40 g of liquid sulphur trioxide in 600 ml of dichloroethane. The reaction mixture was warmed to 70° – 75° C for 18 hours and then worked up as described in Example 1.

340 ml of a weakly basic ion exchanger with an acid-binding capacity of 2.15 equivalents/l for N/10 hydrochloric acid were obtained.

EXAMPLE 11

250 g of a styrene bead polymer crosslinked with 4% of divinylbenzene were swollen for 1 hour in a suspension of 495 g of bis-phthalimidomethyl ether in 2,000 g of dichloroethane at 70° – 75° C and 60 g of liquid sulphur trioxide were then added dropwise to the mixture in the course of 6 hours, whilst warming to the reflux temperature (84°) and the mixture was heated under reflux for a further 18 hours, the water of reaction formed being removed from the system. The mixture was worked up as in Example 1. 820 ml of a weakly basic ion exchanger with an acid-binding capacity of 2.85 equivalents/l for N/10 hydrochloric acid were obtained.

Obviously many modifications and variations of the present invention are possible in the light of the above teachings. It is, therefore, to be understood that within the scope of the appended claims the invention may be practiced otherwise than as specifically described.

What is claimed is:

1. In the process of aminoalkylating a crosslinked, water-insoluble, organic polymer containing aromatic nuclei in the presence of a swelling agent and an alkylation catalyst, the improvement according to which sulphur trioxide is used as the catalyst and the aminoalkylating agent is a bis-dicarboximidoalkyl ether.

2. The process of claim 1 in which the sulphur trioxide is added to the reaction mixture in undissolved form.

3. The process of claim 1 in which the sulphur trioxide is supplied as a solution in $H_2SO_4$.

4. The process of claim 1 in which the sulphur trioxide is supplied as an adduct with the bis-dicarboximidoalkyl ether.

5. The process of claim 1, characterized in that the bis-dicarboximidoalkyl ether is bis-phthalimidomethyl ether.

6. The process of claim 1, characterized in that the bis-dicarboximidoalkyl ether is employed in amounts of about 0.5 to about 4 mols for every mol of the aromatic nuclei present in the polymer.

7. The process of claim 1, characterized in that the polymer is macroporous.

8. The process of claim 1 in which the aminoalkylated resin is saponified to produce an anion-exchange resin.

* * * * *